(12) United States Patent
Bennett

(10) Patent No.: US 6,820,141 B2
(45) Date of Patent: Nov. 16, 2004

(54) SYSTEM AND METHOD OF DETERMINING THE SOURCE OF A CODEC

(75) Inventor: Joseph A. Bennett, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 09/967,809

(22) Filed: Sep. 28, 2001

(65) Prior Publication Data

US 2003/0065846 A1 Apr. 3, 2003

(51) Int. Cl.[7] ............................................... G06F 13/00
(52) U.S. Cl. ........................... 710/15; 710/22; 710/104; 710/107
(58) Field of Search ................................ 710/8, 10, 12, 710/15, 16, 22, 104, 107, 301, 305

(56) References Cited

U.S. PATENT DOCUMENTS 6,128,317 A * 10/2000 Mackre ...................... 370/479
6,195,766 B1 * 2/2001 Maxwell et al. .............. 714/38
6,259,957 B1 * 7/2001 Alexander et al. ............ 700/94
6,510,215 B1 * 1/2003 Hendrickson .......... 379/142.15
2002/0068988 A1 * 6/2002 Chan et al. ................... 700/94

FOREIGN PATENT DOCUMENTS

EP         1 089 164 A2 *  4/2001  ............ G06F/3/16

OTHER PUBLICATIONS

Audio Codec '97, Revision 2.2, Sep. 2000, Intel Corporation, pp. 1–11, 21–25, and 29.*

* cited by examiner

*Primary Examiner*—Glenn A. Auve
(74) *Attorney, Agent, or Firm*—Blakely, Sokoloff, Taylor & Zafman LLP

(57) ABSTRACT

A system and method to determine a port that a codec is attached is disclosed. An access will be attempted to a codec, and the internal hardware of the host will watch which input port the response comes in on, and log that port for the software. Software can then map that input port to direct memory access/addressing engines in the host such that data streams can be steered to the appropriate application.

22 Claims, 2 Drawing Sheets

SYSTEM AND METHOD OF DETERMINING THE SOURCE OF A CODEC

FIELD

The invention relates to digital data processing and more particularly, to audio signal processing.

BACKGROUND DESCRIPTION

The ability to process audio information has become increasingly important in many applications. For example, audio is important in multimedia applications, such as gaming and telecommunications. Therefore, audio signal processors are typically included on the motherboard or can be available in the form of an add-on audio board or riser card.

One of the key components in most digital audio information processing system is the coder/decoder (codec) unit. The codec converts input analog audio information into a digital format for processing by a digital audio processor. The codec also converts outgoing signals from the audio processor from digital to analog format for output to the user. The codec may also mix analog and/or digital audio streams.

As demands for multimedia increases, multiple codecs may be attached to a host. However, there is currently no mechanism in the host to determine which codec is attached to which input pin on the host. All input sources must be "OR"ed together in the host, and therefore intelligent mixing of audio input streams cannot be done. For example, an audio input from a stereo cannot be intelligently mixed with an audio input from a user microphone and then sent to output speakers. In addition, host software such as Basic Input/Output System (BIOS) must have a priori knowledge of which codecs are attached to the system, making upgrades to a system by end users difficult.

BRIEF DESCRIPTION OF THE DRAWINGS

The invention will be described in detail with reference to the following drawings in which like reference numerals refer to like elements wherein.

DETAILED DESCRIPTION

In the following description, specific details are given to provide a thorough understanding of the invention. For example, some circuits are shown in block diagram in order not to obscure the present invention in unnecessary detail. However, it will be understood by those skilled in the art that the present invention may be practiced without such specific details.

As disclosed herein, the term "module" may be a software module, a hardware module, or a combination thereof. The term "machine readable medium" includes, but is not limited to portable or fixed storage devices, optical storage devices, and any other devices capable of storing instructions, codes and/or data. The term "instructions" may refer to a single or a group of instructions, and may be one or a combination of software and firmware including data, codes, and programs that can be read and/or executed to perform certain tasks.

Also, it is noted that the invention may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

A host often supports more than one audio coder/decoder (hereinafter "codec") to process multiple audio data streams. The invention generally determines the source of each codec supported by the host. Here, the source refers to the port or pin of the host to which a codec is attached. By determining which codec is attached to which port or pin of the host, data streams from different codecs can intelligently be mixed and output.

Figure 1:
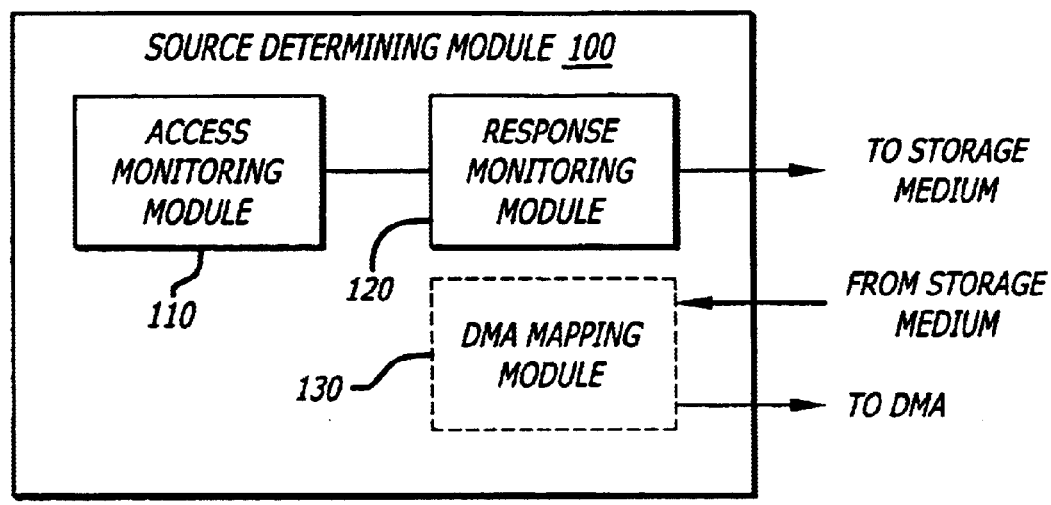
FIG. 1 shows an exemplary source determining module in accordance with one embodiment of the invention.

FIG. 1 shows an exemplary source determining module 100 in accordance with one embodiment of the invention. The source determining module 100 includes an access monitoring module (AMM) 110 to monitor accesses to codecs and a response monitoring module (RMM) 120 to monitor responses received from the codecs. The AMM 110 determines if an access to a codec space is attempted. If a codec is attached to the host, the RMM 120 detects the input port from which a response to the access is received and determines that input port as the source of the codec.

The source information, i.e. the input port of a host to which a codec is attached, can be stored in a storage medium. In addition, the source determining module 100 may include a direct memory access/addressing (DMA) mapping module 130 to map the source information from the storage medium to DMA engines in the host. The source information can then be used to intelligently mix data streams from different codecs. For example, audio input from a stereo can be mixed with an audio input from a user microphone and sent to output speakers.

Figure 2:
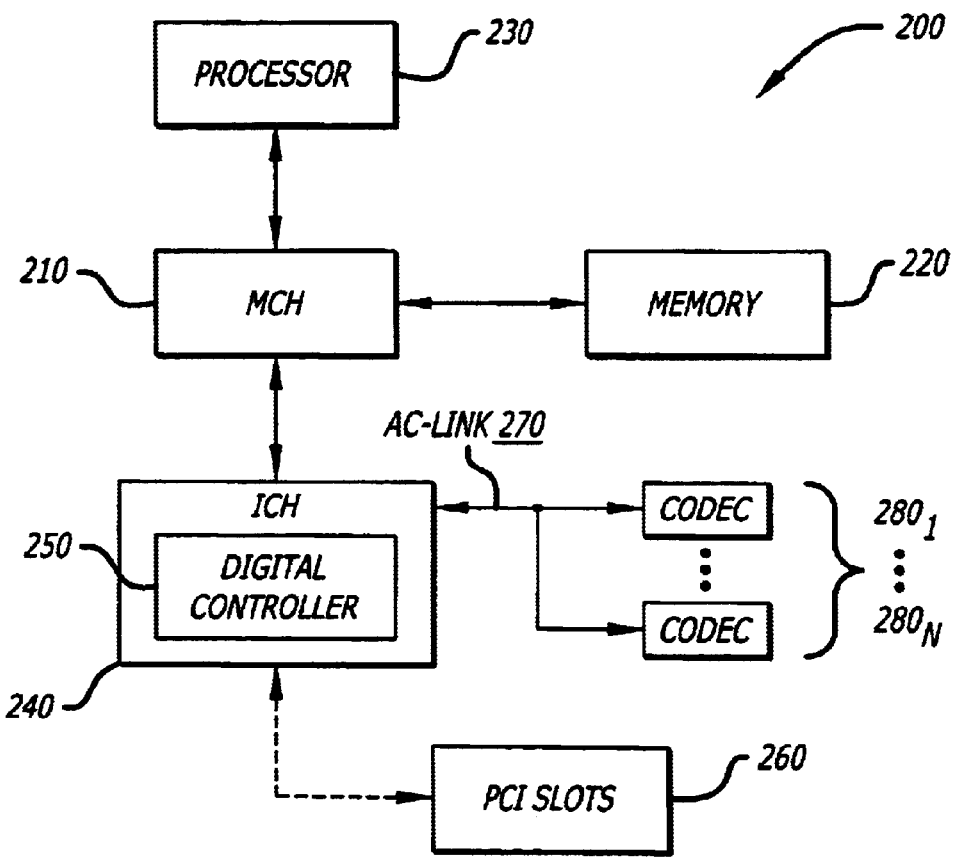
FIG. 2 shows an exemplary system implementing a source determining module in accordance with one embodiment of the invention.

FIG. 2 shows an exemplary system 200 implementing a source determining module in accordance with one embodiment of the invention. The system 200 includes a memory controller hub (MCH) 210 coupled to a memory 220, a processor 230, an input/output controller hub (ICH) 240. The ICH 240 includes a digital controller 250 that interfaces as a host to which codecs can be attached. A source determining module, for example the source determining module 100 as shown in FIG. 1, can be implemented in the digital controller 250 in software, firmware, hardware or a combination thereof to assist the system 200 in determining the sources of codecs supported. For example, the digital controller 250 may include a machine readable medium from which instructions corresponding to the source determining module 100 can be loaded onto the digital controller 250 for determining the sources of codecs. The ICH 240 may also include peripheral component interconnect (PCI) slots 260 to support plug and play functions.

In one embodiment, the digital controller 250 interfaces Audio Codec 97 (AC'97) and can be any controller conforming to the AC'97 specification in the Audio Codec'97

Revision 2.2, dated September 2000, available from Intel Corporation. The AC'97 codec performs digital to analog and analog to digital conversions, mixing, and analog input/output for audio (or modem), and functions as slave to the digital controller 250. A digital link, referred to as AC-link 270, connects the digital controller 250 to the AC '97 Codecs $280_1$... $280_N$. The AC-link is a bi-directional, 5-wire, serial Time Division Multiplexing (TDM) format interface. Currently, the AC-link supports connections between a single controller and up to four codecs on a circuit board or riser card. However, the invention is not limited to the AC-link and can be applied to any other links that supports connections between a single controller and N number of codecs, where N>0.

Figure 3:
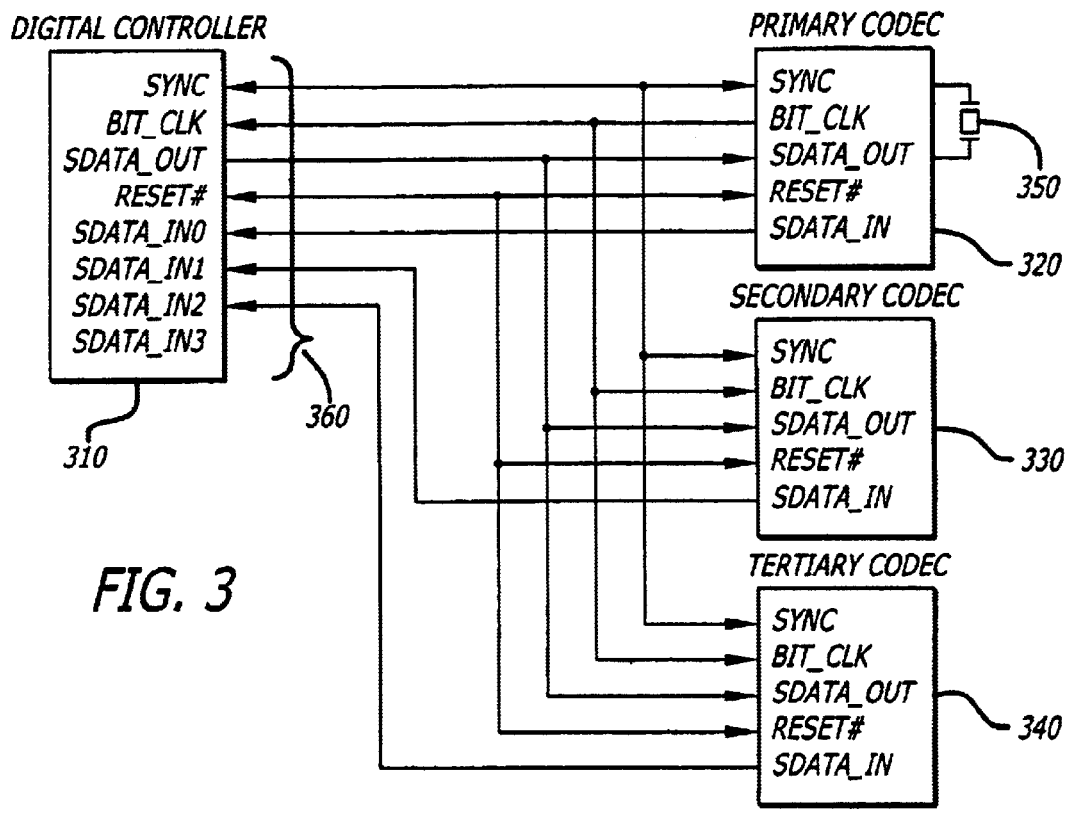
FIG. 3 shows an exemplary hardware connection of a host to audio codecs.

FIG. 3 shows an exemplary hardware connection of AC'97 codecs to the host. In the example, a digital controller 310 supports a primary codec 320, a secondary codec 330 and a tertiary codec 340 through an AC-link 360. Note here that the AC-link 360 is a 5-wire interface to the codecs 320, 330 and 340. The AC-link 360 provides for the input of the synchronization (SYNC), data from the digital controller 310 (SDATA_OUT) and the reset signals (RESET #), and for the output of link clock (BIT_CLK) and data to the controller (SDATA_IN_0, SDATA_IN_2, SDATA_IN_2).

In multiple codec AC-link implementation, the primary codec 320 generates the master AC-link BIT_CLK for both the host and any secondary codecs. The BIT_CLK can be generated by an external crystal 350 attached to the primary codec 320 or may be generated by an external oscillator (not shown) and input to the primary codec 320. Also as shown, the codecs can save host pins by sharing the SYNC, SDATA_OUT, and RESET# from the digital controller 310. However, each codec requires its own SDATA_IN pin back to the host. Detailed information about the AC'97 interface may be found in the Audio Codec '97 Revision 2.2.

The invention allows a system to determine the port that an AC'97 codec is attached through the assist of the source determining module. In one embodiment, the an access will be attempted to a codec, and the internal hardware of the host will watch which input port the response comes in on, and log that port for the software. The software can then map that input port to DMA engines in the host so that the audio streams can be steered to the appropriate application.

In particular, the host contains log registers corresponding to each codec that can be supported by the host. For example, the digital controller 250 may contain registers {00, 01, 10, and 11} to correspond to four codecs that can be supported by the AC-link. Each AC'97 codec responds to a read and write access commands directed to an assigned register identification (ID). Typically, the primary codec 320 responds to register access commands directed to codec ID 00 while the secondary codecs 330 and 340 are respond to register access commands directed to codec IDs 01, 10, or 11. The data in line that returns a response will be logged into a register.

Figure 4:
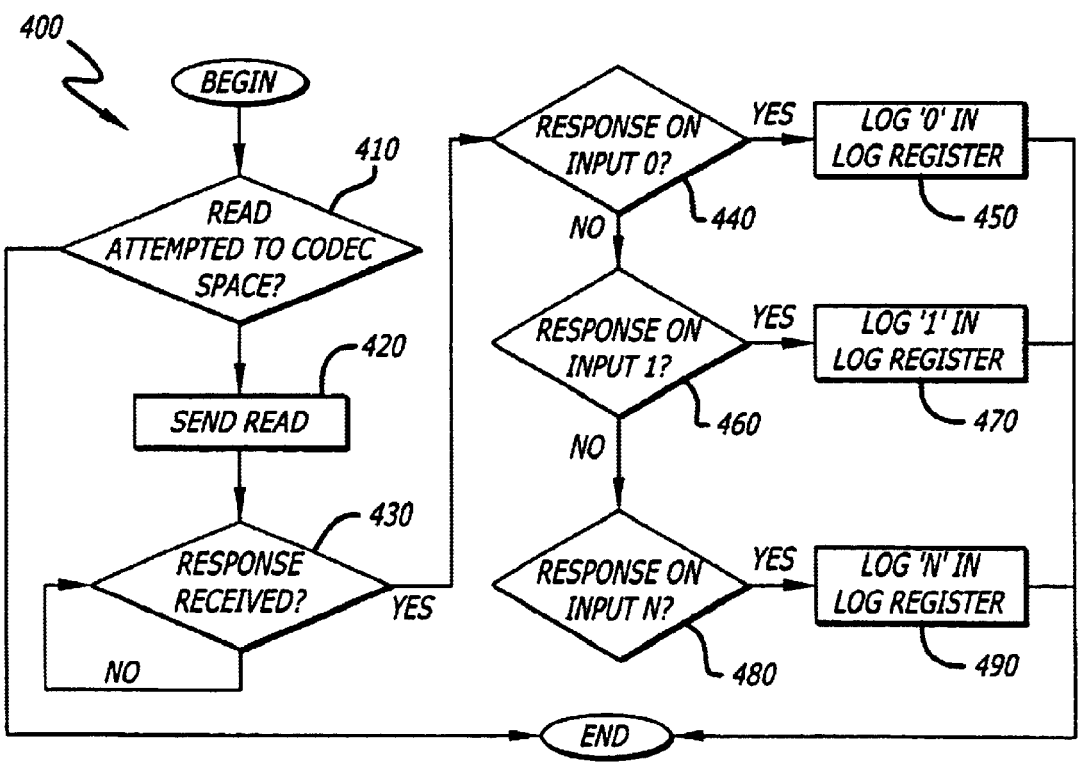
FIG. 4 is a flowchart showing an exemplary method for logging the response codec from a read to the codec space.

FIG. 4 is a flow chart showing an exemplary method 400 for logging the response from a read to the codec space in accordance with one embodiment of the invention. When the digital controller 250 attempts to read to a codec space (block 410), the read is sent (block 420). If a response is received, a determination is made whether the response is from Input 0 (blocks 430 and 440). If the response is from Input 0, the digital controller 250 logs "0" or "00" in the Log Register (block 450). If the response is not from Input 0, a determination is made whether the response is from Input 1 (blocks 440 and 460). If the response is from Input 1, the digital controller 250 logs "1" or "01" in the Log Register (block 470). If the response is not from Input 1, determination continuously made whether the response is from Input N (blocks 460 and 480). If the response is from an Nth Input, the digital controller 250 logs "N" in the Log Register (block 490).

Accordingly, the invention allows a system to determine and store the port to which a codec is attached. This enables audio input streams from multiple codecs to be mixed intelligently and output. In addition, by storing the source information, the host software such as BIOS can be given priori knowledge of which codecs are attached to the system. Therefore, the invention allows additions of one or more codecs to be easily implemented, for example, in mobile docking and aftermarket upgrades.

Furthermore, although the invention has been described with reference to an audio codec 97, the invention can be applied to other codecs such as audio/modem codecs. Also, the source determining module may be implemented in a location other than within the digital controller 250.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus comprising:
   an access monitoring module to monitor accesses to coder/decoder units (codecs);
   a response monitoring module to monitor responses received from the codecs in response to the accesses to determine source information of codecs;
   a storage medium to store the source information of the codecs; and
   a mapping module to map the source information from the storage medium to direct memory access/addressing engines in a host of the codecs.

2. The apparatus of claim 1, wherein the host is a digital controller being part of an input/output controller hub.

3. The apparatus of claim 1, wherein the response monitoring module determines an input port from which a response to an access to a first codec is received as the input port of the host to which the first codec is attached.

4. The apparatus of claim 3, wherein the host is a AC'97 host.

5. The apparatus of claim 4, wherein the first codec is a AC'97 codec.

6. A method comprising:
   monitoring an access to a first codec;
   monitoring a response to the access to determine source information of the first codec, the source information being an input Port of a host to which a codec is attached;
   storing the source information in a memory; and
   mapping the source information from the memory to direct memory access/addressing engines in the host.

7. The method of claim 6, further comprising:
   storing the source information of the first codec.

8. The method of claim 6, further comprising:
   adding a second codec to another input port of the host;
   monitoring an access to the second codec to determine the source information of the second codec; and
   storing the source information of the second codec.

9. The method of claim 6, wherein determining the input port to which the first codec is attached comprises:

determining the input port from which a response to the access is received as the input port of the host to which the first codec is attached.

10. The method of claim 9, wherein determining the input port to which the first codec is attached comprises:

determining the data in line of the host from which a response to the read access comes in as the input port of the host to which the first codec is attached.

11. The method of claim 6, wherein the host is a AC'97 host.

12. The method of claim 11, wherein the first codec is a AC'97 codec.

13. The method of claim 6, wherein the source information is stored in a host controller register.

14. A system comprising:

a first codec; and a digital controller to which the first codecs is attached, the digital controller being a AC '97 host to monitor an access to the first codec to determine source information of the first codec, the source information being an input port of the digital controller to which the first codec is attached.

15. The system of claim 14, further comprising:

a storage medium to store the source information of the first codec.

16. The system of claim 15, further comprising:

a second codec added to another input port of the digital controller; and wherein the digital controller to monitor an access to the second codec to determine the source information of the second codec and to store the source information of the second codec in the storage medium.

17. The system of claim 14, wherein the digital controller determines the input port to which the first codec is attached by determining the input port from which a response to the access is received as the input port of the host to which the first codec is attached.

18. The system of claim 14, wherein the first codec is a AC'97 codec.

19. The system of claim 14, wherein the digital controller to determines a data in line of the AC'97 host from which a response to the read access comes in as the input port of the host to which the first codec is attached.

20. A system comprising:

first codec;

a storage medium to store storage information of the first codec identifying an input port to which the first codec is attached; and a digital controller including a direct memory access/ addressing engines to map the source information from the storage medium to the direct memory access/ addressing engine.

21. Instructions loaded in a machine readable medium comprising:

a first group of instructions to monitor accesses to coder/ decoder units (codecs);

a second group of instructions to monitor responses received from codecs in response to the accesses to determine source information of codecs;

a third group of instructions to store the source information of the codecs in a storage medium; and a fourth group of instructions to map the source information from the storage medium to direct memory access/ addressing engines in a host of the codecs.

22. The instructions of claim 21, wherein the second group of instructions to determine an input port from which a response to an access to a first codec is received as the input port of a host to which the first codec is attached.

* * * * *